April 25, 1944.    B. S. WEAVER    2,347,209

TORQUE MEASURING DEVICE

Filed Feb. 22, 1943

Inventor:
Burr S. Weaver,
by Harry E. Dunham
His Attorney.

Patented Apr. 25, 1944

2,347,209

UNITED STATES PATENT OFFICE 2,347,209

TORQUE MEASURING DEVICE

Burr S. Weaver, Scotia, N. Y., assignor to General Electric Company, a corporation of New York Application February 22, 1943, Serial No. 476,670

11 Claims. (Cl. 265—24)

My invention relates to improvements in torque measuring devices and more particularly to such devices arranged to measure the torque of coaxial rotating shafts.

An object of my invention is to provide an improved torque measuring device for measuring the torque of coaxial oppositely rotating shafts.

Another object of my invention is to provide an improved tandem dynamometer set construction for measuring the separate and combined torques of a pair of dynamometers having coaxial shafts adapted to be driven in opposite directions from either end of the set and for making such measurements irrespective of the direction of rotation of the driving devices.

Further objects and advantages of my invention will become apparent and my invention will be better understood from the following description referring to the accompanying drawing, and the features of novelty which characterize my invention will be pointed out with particularity in the claims annexed to and forming part of this specification.

Certain types of drives include a plurality of substantially coaxial shafts adapted to rotate in different directions, and in testing the driving devices, it is desirable to be able to determine the separate torques of the different drive shafts as well as the simultaneous combined torque of all of the shafts rotating in their respective directions. Furthermore, in order to utilize the torque measuring device more efficiently, it is desirable to be able to test one driving device while another is being prepared for test and then to test the other driving device while the first one is being removed and another being prepared for test in place of the first one. In order to measure these various torques, I provide a torque measuring device including a plurality of dynamometers having substantially coaxial shafts which are adapted to measure, separately or combined, the torques of a plurality of shafts rotating in different directions and provided with coupling elements for connecting either end of the dynamometers to the driving device such that one driving device may be tested at one end of the test set while another is being prepared for connection at the other end of the set.

Figure 1:
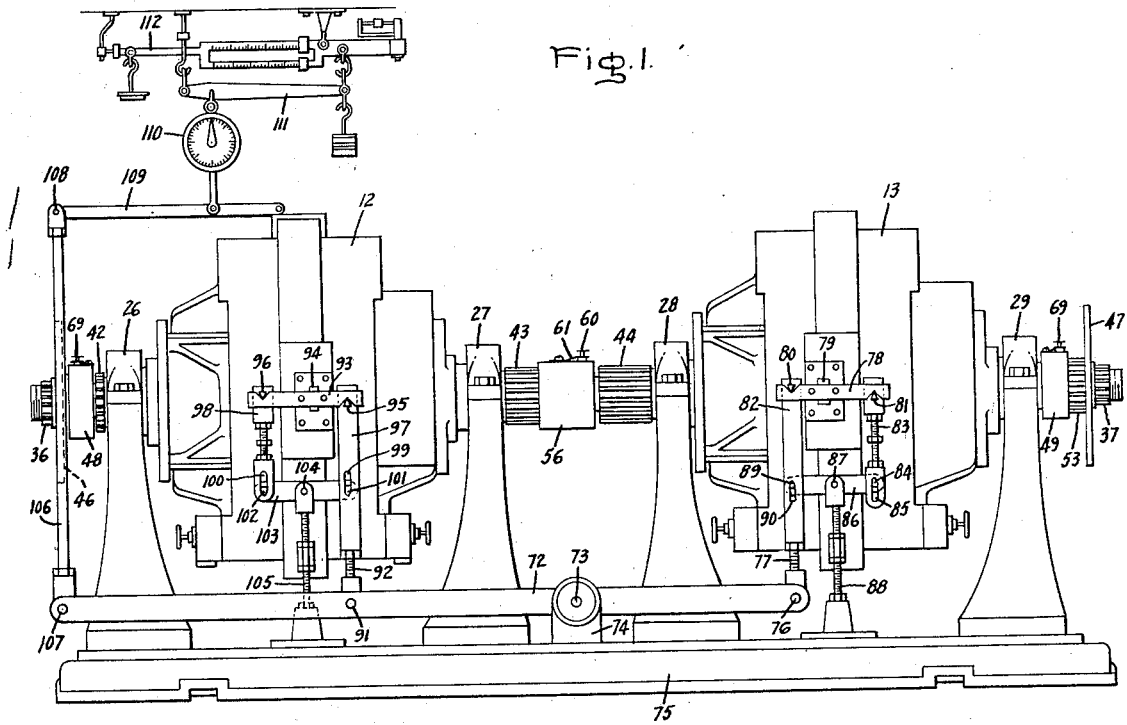
Figure 2:
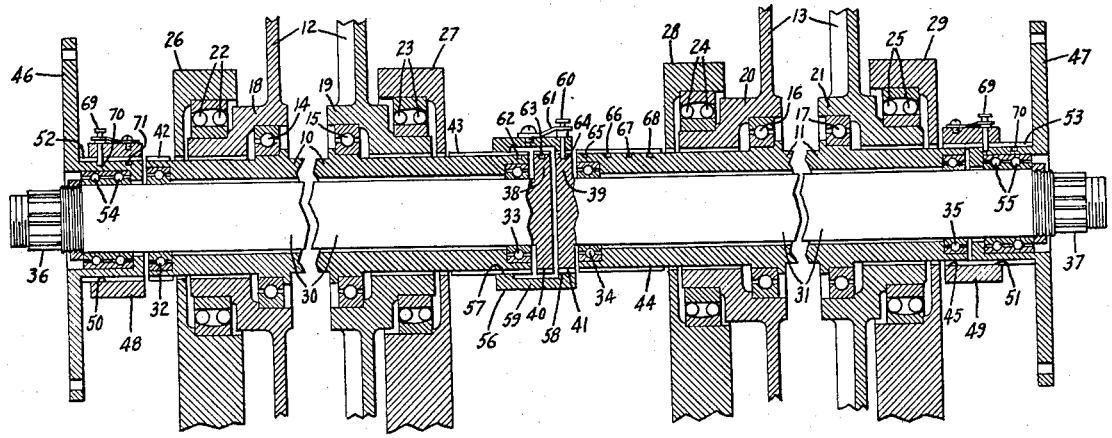

In the drawing, Fig. 1 is a side elevational view of a dynamometer set embodying my invention; and Fig. 2 is an enlarged sectional view of the shafts and supporting bearings of the dynamometers.

Referring to the drawing, I have shown a torque measuring device including a pair of axially spaced apart dynamometers arranged in tandem relationship. Each dynamometer is constructed as a complete unit which may be used to measure torque independently. The dynamometers are provided with rotatable members mounted on hollow tubular sleeve or quill shafts 10 and 11 and are adapted to produce a torque reaction on relatively rotatable torque reaction outer members 12 and 13. The quill shafts 10 and 11 are rotatably supported on the torque reaction members 12 and 13 by ball bearings 14 and 15, and 16 and 17 at each end thereof, arranged in bearing housings formed by hubs 18 and 19, and 20 and 21, respectively, of the torque reaction members 12 and 13. These members 12 and 13 also are rotatably supported at each end thereof by ball bearings 22 and 23, and 24 and 25 which are arranged within bearing housings formed in pedestal supports 26 and 27, and 28 and 29, respectively. A second pair of shafts 30 and 31 are provided which are arranged within the quill shafts 10 and 11 and are rotatably supported therein by bearings 32 and 33, and 34 and 35, respectively. The other ends of the shafts 30 and 31 adjacent the outer ends of the dynamometer set are formed with splines 36 and 37, respectively, for connection to shafts of driving devices. The inner adjacent ends of these shafts 30 and 31 are formed with annular outwardly extending flanges 38 and 39 on the outer peripheral edges of which splines 40 and 41, respectively, are formed. In order to provide a driving connection between the shafts 10 and 11 and driving device shafts, both ends of the quill shafts are provided with splines 42 and 43, and 44 and 45. The outer ends of the quill shafts are adapted to be connected to coupling elements 46 and 47 through axially slidable connecting or coupling sleeve members 48 and 49 having internal splines 50 and 51 adapted to engage the shaft splines 42 and 45 and splines 52 and 53 formed on the coupling elements 46 and 47 to provide a driving connection therebetween. The coupling elements 46 and 47 are rotatably supported on the outer ends of the shafts 30 and 31 by non-tilting double bearings 54 and 55, and the splines 52 and 53 are of such length as to provide for sliding the coupling sleeves 48 and 49 completely thereon out of engagement with the quill shaft splines 42 and 45, thereby disconnecting the coupling elements from the quill shafts. Either of the quill shafts may be connected to the inner shaft in the other quill shaft through the respective quill shaft splined portions 43 or 44 and the inner shaft splined portions 40 or 41 by an axially slidable internally splined connecting or coupling sleeve member 56 having splined end portions 57 and 58 with an intermediate relieved portion 59. This coupling sleeve is constructed relative to the inner splined ends 40, 41, 43, and 44 of the shafts 30, 31, 10, and 11 to provide for the measurement of seven different combinations of driving torques and speeds from the different ends of the dynamometer set. A latching pin 60 is provided which is biased inwardly by a spring 61 and is adapted to engage seven sockets 62, 63, 64, 65, 66, 67, and 68 formed in the splined inner ends of the shafts for latching the coupling sleeve 56 in any of its seven positions. As shown in Fig. 2, this coupling sleeve is arranged in engagement with the splined end portion of one of the quill shafts and the splined end portion of the inner shaft in the other quill shaft while the relieved intermediate portion 59 forms a guard about the splined end of the inner shaft which is not connected to a quill shaft to prevent connection thereof to the other quill shaft and also provide a safety guard around this member. Each of the end internally splined coupling sleeve members 48 and 49 is provided with a spring biased latching pin device 69 adapted to latch the sleeves in either of two positions by engagement of the latch pins with sockets 70 and 71 in the splined members. With the coupling sleeves in this position the dynamometer on shaft 11 is adapted to be driven by the coupling element 47 and the dynamometer on shaft 10 is adapted to be driven through shaft 31 and coupling splines 37. Thus, each dynamometer is adapted to be connected to a different driving member on the right side of the set as shown in this figure. Similarly, each dynamometer is adapted to be connected to a different driving member on the left side of the set by shifting the coupling sleeve 56 to the right to a position with the latching pin 60 in socket 66 and with the coupling sleeves 48 and 49 shifted to the right-hand latched positions. It also may be desirable to test a single driving member having a capacity greater than either dynamometer alone and less than both combined. In such a case the two shafts 10 and 11 may be coupled together by shifting the coupling sleeve 56 to a position with the latching pin in socket 65 and with either sleeve 48 or 49 in engagement with the splines 42 or 45 of shafts 10 or 11, depending on whether the driving member is on the left or right respectively of the set as shown in Fig. 2. If only a single dynamometer is to be used to measure the torque of a single drive shaft, the coupling sleeve 56 may be shifted so that the latching pin 60 engages sockets 62, 63, 67, or 68. If the torque of the drive shaft is of an irregular or pulsating type the positions with the pin 60 in sockets 63 and 67 will provide more flexible driving connections by connecting the drive shaft to the shafts 30 and 31, respectively; while, for a substantially non-pulsating regular torque driving member, the coupling sleeve may be shifted to positions with the pin 60 in either sockets 62 or 68 for a direct drive of the shafts 10 or 11 through couplings 46 or 47, respectively.

In order to measure the torque of the torque reaction members, a linkage is provided for connecting the torque reaction members to a force indicating device and includes a longitudinally extending dynamometer lever arm 72 pivotally mounted by a pivot pin 73 on a support 74 arranged longitudinally intermediate the two dynamometers and mounted on a base 75. One end of the dynamometer lever 72 is pivotally connected by a pivot pin 76 to an adjustable link member 77 of a reverse torque linkage mechanism which is arranged to transmit an upward force to the pin 76 for either direction of torque of the torque reaction member 13. This mechanism includes a bar 78 secured to the end of a torque arm 79 which is rigidly secured to the exterior of the dynamometer member 13. The ends of the bar 78 are provided with notches arranged to engage knife edges 80 and 81 secured to the upper ends of links 82 and 83, respectively, of the reverse torque mechanism. If the torque on the torque reaction member 13 produces an upward force on the torque arm 79, the notch in the left end of the bar 78 will engage knife edge 80 and will exert an upward force on the link 82 and 77 which will transmit this upward force directly to the pin 76. If the torque on the torque reaction member 13 produces a downward force on the torque arm 79, the notch in the right end of the bar 78 will engage the knife edge 81 and will exert a downward force on the link 83, which will cause the lower end of the link 83 to engage a knife edge 84 arranged in a slot 85 in the link 83. The knife edge 84 is secured to the end of a force reversing and transmitting lever 86 which is pivotally supported at the center thereof by a pivot pin 87 on a stationary mounting 88 secured to the base 75 and is provided with a knife edge 89 in the other end thereof arranged in a slot 90 in the link 82. The downward force on the knife edge 84 is transmitted as an upward force to the link 82 by the knife edge 89 and a corresponding upward force is exerted on the pin 76 connected to the lever 72. The arrangement of the notches in the bar 78 and of the slots 85 and 90 provides for the free transmittal of forces in either direction without interference of the unused parts of the mechanism. Thus, the force transmitted to the pin 76 from the torque reaction member 13 is always in an upward direction and tends to rotate the dynamometer lever 72 in a counterclockwise direction. The lever 72 also is secured by a pivot pin 91 to an adjustable link member 92 of another reverse torque mechanism connected to the torque reaction member 12. This reverse torque mechanism is similar to the mechanism associated with the dynamometer member 13 and includes a bar 93 rigidly secured to the member 12 by a torque arm 94 and is arranged to transmit a downward force to the pin 91 for either direction of torque on the member 12. The bar 93 is formed with notches in the ends thereof adapted to engage knife edges 95 and 96 secured to the upper ends of links 97 and 98 of the reverse torque mechanism. Slots 99 and 100 are formed in the links 97 and 98, respectively, and are arranged in engagement with knife edges 101 and 102 secured to a force reversing and transferring lever 103 which is pivotally mounted on a pivot pin 104. The pivot pin 104 is supported on a mounting bracket 105 mounted on the base 75. If the force on the torque arm 94 is in a downward direction, it is transmitted directly to the pivot pin 91 through the bar 93, the knife edge 95, and the link 97 and 92; while if the force on the torque arm 94 is in an upward direction, it is transmitted to the pin 91 through the bar 93, the knife edge 96, the link 98, and the knife edge 102, as an upward force to the force reversing lever 103 and from this lever as a downward force to the knife edge 101 and through the link 97 and 92 to the pin 91. Thus, the force transferred to the pin 91 from the torque reaction member 12 is always in a downward direction and also tends to rotate the dynamometer lever 72 in a counter-clockwise direction. The pins 76 and 91 are arranged equal distances from the pivotal supporting pin 73 of the link 72 so that their leverage about the pin 73 is equal. This linkage provides for a simple addition of the torques of the torque reaction members 12 and 13. The indication of this summation is obtained by connecting the dynamometer lever 72 to a suitable force measuring or indicating device through a link 106 which is pivotally secured to an end of the lever 72 by a pivot pin 107 and pivotally secured by a pivot pin 108 to a lever 109 connected to a spring scale 110 and a set of balance arms 111 and 112. The torque reaction of either of the dynamometers may be measured separately by disconnecting the dynamometer lever 72 from its connection to the torque reaction member which is not to be used and by not coupling the corresponding rotatable member to a drive shaft. Thus by disconnecting the link member 92 from the pivot pin 91, the torque reaction of the torque reaction member 13 can be measured separately from that of the member 12, taking into account any slight static unbalance which may result and which is readily determinable by the reading of the scale 110 when the machine is not in operation. Similarly, by disconnecting the link 82 from the pivot pin 76, the torque reaction of the torque reaction member 12 can be measured separately from the torque reaction of the member 13.

With this torque measuring device, measurement of the torque of a plurality of oppositely rotating driving members may be readily determined and the torque of such driving members may be measured either separately or combined by the same device. Also, the torque of various driving members with single shafts can be measured. Fig. 2 shows the coupling sleeve members all shifted to the left, which provides for driving the quill shaft 11 through the coupling element 47 and coupling sleeve 49, and for driving the quill shaft 10 through the inner shaft 31 and the coupling sleeve 56, leaving the inner shaft 30, the coupling element 46, and the coupling sleeve 48 free of any connection to either dynamometer. This arrangement provides for the combined testing coaxial drive shafts arranged on the right of the test set. With this arrangement of the coupling sleeves if either dynamometer is disconnected as described above, either dynamometer can be used to test a single drive shaft. Another prime mover may be set up and prepared for test to the left of the dynamometers while testing driving members on the right of the dynamometers. After such tests are completed, the coupling sleeves may be moved to the right and the driving members on the left of the dynamometers may then be connected to the dynamometers and tested while the driving machine on the right is removed and another driving machine is set up for connection and test on completion of tests on the driving member to the left of the dynamometers. This provides for the best utilization of the dynamometer equipment and expedites testing of various driving machines.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A torque measuring device including a pair of rotatable members and relatively rotatable torque reaction members adapted to cooperate with said rotatable members, means for rotatably supporting said torque reaction members, a quill shaft for each of said rotatable members, means for rotatably supporting said quill shafts, a second shaft through each of said rotatable members, means for rotatably supporting said second shafts, and means for connecting each of said rotatable members to driving means at either end thereof including a pair of coupling elements each rotatably supported on a different one of said second shafts adjacent the outer ends thereof, means for connecting either of said quill shafts to one of said second shafts, means for connecting said quill shafts to the coupling elements adjacent the outer ends thereof for connection to driving means, and means for connecting the outer end of each of said second shafts to a driving means.

2. A torque measuring device including a pair of rotatable members and relatively rotatable torque reaction members adapted to cooperate with said rotatable members, means for rotatably supporting said torque reaction members, a quill shaft for each of said rotatable members, a second shaft through each of said rotatable members, means for rotatably supporting said second shafts, and means for connecting each of said rotatable members to driving means at either end thereof including a pair of coupling elements each rotatably supported adjacent the outer end of one of said quill shafts, means for connecting either of said quill shafts to one of said second shafts, means for latching said connecting means in any of said shaft connecting positions, means for connecting said quill shafts to the coupling elements adjacent the outer ends thereof for connection to driving means, and means for connecting the outer end of each of said second shafts to a driving means.

3. A torque measuring device including a pair of rotatable members and relatively rotatable torque reaction members adapted to cooperate with said rotatable members, means for rotatably supporting said torque reaction members, a quill shaft for each of said rotatable members, means for rotatably supporting said quill shafts, a second shaft through each of said rotatable members, means for rotatably supporting said second shafts, and means for connecting each of said rotatable members to driving means at either end thereof including a pair of coupling elements arranged one adjacent the outer end of each of said quill shafts, means for rotatably supporting said coupling elements, means for connecting either of said quill shafts to one of said second shafts, means for connecting said quill shafts to the coupling elements adjacent the outer ends thereof for connection to driving means, and means for connecting the outer end of each of said second shafts to a driving means.

4. A torque measuring device including a pair of tandem dynamometers having rotatable members and relatively rotatable torque reaction members adapted to cooperate with said rotatable members, means for rotatably supporting said torque reaction members, means including a pair of quill shafts each arranged for rotatably supporting a different one of said rotatable members, a second pair of shafts each rotatably supported in a different one of said quill shafts, means for connecting each of said rotatable members to driving means at either end thereof including a pair of coupling elements each rotatably supported on a different one of said second shafts adjacent the outer ends of said tandem dynamometers, means for connecting either of said quill shafts to one of said second shafts, means for connecting either of said quill shafts to the coupling element adjacent the outer end thereof for connection to a driving means, and means for connecting the outer end of each of said second shafts to a driving means, and means for measuring the torque reaction of said torque reaction members.

5. A torque measuring device including a pair of tandem dynamometers having rotatable members and relatively rotatable torque reaction members adapted to cooperate with said rotatable members, means for rotatably supporting said torque reaction members, means including a pair of quill shafts each arranged for rotatably supporting a different one of said rotatable members, a second pair of shafts each rotatably supported in a different one of said quill shafts, means for connecting each of said rotatable members to driving means at either end thereof including a pair of coupling elements each rotatably supported on a different one of said second shafts adjacent the outer ends of said tandem dynamometers, means for connecting either of said quill shafts to one of said second shafts and for providing a guard about the adjacent end of the other of said second shafts to prevent connection thereof to the other of said quill shafts, means for connecting either of said quill shafts to the coupling element adjacent the outer end thereof for connection to a driving means, and means for connecting the outer end of each of said second shafts to a driving means, and means for measuring the combined torque reaction of all of said torque reaction members.

6. A torque measuring device including a pair of rotatable members and relatively rotatable torque reaction members adapted to cooperate with said rotatable members, means for rotatably supporting said torque reaction members, a quill shaft for each of said rotatable members, a second shaft arranged through each of said rotatable members, means for rotatably supporting said second shafts, and means for connecting each of said rotatable members to driving means at either end thereof including splined portions adjacent each end of all of said shafts, a pair of coupling elements each rotatably supported on a different one of said second shafts adjacent the outer ends thereof, a splined portion on each of said coupling elements, splined means for connecting either of said quill shafts to one of said second shafts through said splined shaft portions and for providing a guard about the adjacent splined portion of the other of said second shafts to prevent connection thereof to the other of said quill shafts, means for latching said connecting means in any one of said shaft connecting positions, means for engaging said splined portions of said quill shafts and said coupling elements for connecting said quill shafts to the coupling elements adjacent the outer ends thereof for connection to driving means, and means including the outer splined end portion of each of said second shafts for connecting said second shafts to a driving means.

7. A torque measuring device including a pair of tandem dynamometers having rotatable members and relatively rotatable torque reaction members adapted to cooperate with said rotatable members, means for rotatably supporting said torque reaction members, means including a pair of quill shafts each arranged for rotatably supporting a different one of said rotatable members, a second pair of shafts arranged one through each of said rotatable members, means for rotatably supporting said second shafts, means for connecting each of said rotatable members to driving means at either end thereof including a pair of coupling elements each rotatably supported on a different one of said second shafts adjacent the outer ends of said tandem dynamometers, means for connecting either of said quill shafts to one of said second shafts, means for connecting either of said quill shafts to the coupling element adjacent the outer end thereof for connection to a driving means, and means for connecting the outer end of each of said second shafts to a driving means, each of said means for connecting said quill shafts to said coupling elements being adapted to be disconnected when the adjacent quill shaft is connected to one of said second shafts, and means for measuring the torque reaction of said torque reaction members.

8. A torque measuring device including a pair of rotatable members and relatively rotatable torque reaction members adapted to cooperate with said rotatable members, means for rotatably supporting said torque reaction members, a quill shaft for each of said rotatable members, a second shaft rotatably supported in each of said quill shafts, means for connecting each of said rotatable members to driving means at either end thereof including splined portions adjacent each end of all of said shafts, a pair of coupling elements each rotatably supported on a different one of said second shafts adjacent the outer ends thereof, a splined portion on each of said coupling elements, splined means for connecting either of said quill shafts to one of said second shafts through said splined shaft portions, means for engaging said splined portions of said quill shafts and said coupling elements for connecting said quill shafts to the coupling elements adjacent the outer ends thereof for connection to driving means, means for latching all of said connecting means in any one of said shaft connecting positions, and means including the outer splined end portion of each of said second shafts for connecting said second shafts to driving means, and means for measuring the torque reaction of said torque reaction members.

9. A torque measuring device including a pair of tandem dynamometers having rotatable members and relatively rotatable torque reaction members adapted to cooperate with said rotatable members, means for rotatably supporting said torque reaction members, means including a pair of quill shafts each arranged for rotatably supporting a different one of said rotatable members, a second pair of shafts each substantially coaxially and rotatably supported in a different one of said quill shafts, means for connecting each of said rotatable members to driving means at either end thereof including a pair of coupling elements arranged one adjacent the outer end of each of said quill shafts, means for rotatably supporting said coupling elements, means for connecting either of said quill shafts to one of said second shafts, means for connecting either of said quill shafts to the coupling element adjacent the outer end thereof for connection to a driving means, and means for connecting the outer end of each of said second shafts to a driving means, said means for connecting said quill shafts to said coupling elements and said means for connecting said quill shafts to said second shafts being provided with latching means for latching in connected and disconnected positions, and means for measuring the torque reaction of said torque reaction members.

10. A torque measuring device including a pair of tandem dynamometers having rotatable members and relatively rotatable torque reaction members adapted to cooperate with said rotatable members, means for rotatably supporting said torque reaction members, means including a pair of quill shafts each arranged for rotatably supporting a different one of said rotatable members, a second pair of shafts arranged one through each of said rotatable members, means for rotatably supporting said second shafts, means for connecting each of said rotatable members to driving means at either end thereof including a pair of coupling elements each rotatably supported on a different one of said second shafts adjacent the outer ends of said tandem dynamometers, means for connecting either of said quill shafts to one of said second shafts, means for connecting either of said quill shafts to the coupling element adjacent the outer end thereof for connection to a driving means, and means for connecting the outer end of each of said second shafts to a driving means, each of said means for connecting said quill shafts to said coupling elements being adapted to be disconnected when the adjacent quill shaft is connected to one of said second shafts, and means for measuring the combined torque reaction of all of said torque reaction members.

11. A torque measuring device including a pair of rotatable members and relatively rotatable torque reaction members adapted to cooperate with said rotatable members, means for rotatably supporting said torque reaction members, a quill shaft for each of said rotatable members, a second shaft rotatably supported in each of said quill shafts, means for connecting each of said rotatable members to driving means at either end thereof including splined portions adjacent each end of all of said shafts, a pair of coupling elements each rotatably supported on a different one of said second shafts adjacent the outer ends thereof, a splined portion on each of said coupling elements, splined means for connecting either of said quill shafts to one of said second shafts through said splined shaft portions, means for latching said connecting means in any one of said shaft connecting positions, means for engaging said splined portions of said quill shafts and said coupling elements for connecting said quill shafts to the coupling elements adjacent the outer ends thereof for connection to driving means, and means including the outer splined end portion of each of said second shafts for connecting said second shafts to a driving means, each of said means for connecting said quill shafts to said coupling elements being adapted to be disconnected when its respective associated quill shaft is connected to one of said second shafts, and means for measuring the torque reaction of said torque reaction members.

BURR S. WEAVER.